United States Patent
Kelly

(10) Patent No.: US 8,904,410 B2
(45) Date of Patent: Dec. 2, 2014

(54) METHODS AND APPARATUS FOR MOBILE DEVICE EVENT DETECTION

(71) Applicant: mCube, Incorporated, San Jose, CA (US)

(72) Inventor: Joseph M. Kelly, Center Point, IA (US)

(73) Assignee: mCube Inc., San Jose, CA (US)

(*) Notice: Subject to any disclaimer, the term of this patent is extended or adjusted under 35 U.S.C. 154(b) by 0 days.

(21) Appl. No.: 13/755,242

(22) Filed: Jan. 31, 2013

(65) Prior Publication Data

US 2013/0205306 A1 Aug. 8, 2013

Related U.S. Application Data

(60) Provisional application No. 61/593,299, filed on Jan. 31, 2012.

(51) Int. Cl.
*G06F 3/00* (2006.01)
*G06F 9/46* (2006.01)
*G06F 13/00* (2006.01)
*G06F 9/54* (2006.01)
*G06F 3/038* (2013.01)

(52) U.S. Cl.
CPC .............. *G06F 9/542* (2013.01); *G06F 3/038* (2013.01); *G06F 2203/0381* (2013.01)
USPC ............................ 719/318; 719/313; 719/320

(58) Field of Classification Search
None
See application file for complete search history.

(56) References Cited

U.S. PATENT DOCUMENTS

2005/0254712 A1* 11/2005 Lindeman ................ 382/224
2009/0099820 A1* 4/2009 Kaplan ..................... 702/189

* cited by examiner

*Primary Examiner* — Craig Dorais
(74) *Attorney, Agent, or Firm* — Kilpatrick Townsend & Stockton LLP

(57) ABSTRACT

A computer-implemented method for determining an action for a user, implemented in a computing system programmed to perform the method includes receiving a first time series of physical perturbations with a first physical sensor in response to physical perturbations of the computing system, receiving a second time series of physical perturbations with a second physical sensor in response to the physical perturbations of the computing system, determining an event vector in response to the first time series of physical perturbations and in response to the second time series of physical perturbations, comparing the event vector to a first event signature to determine a first value, determining occurrence of a first event when the first value exceeds a first threshold, and determining a first action for the computing system in response to the determining in the computing system, occurrence of the first event.

13 Claims, 3 Drawing Sheets

METHODS AND APPARATUS FOR MOBILE DEVICE EVENT DETECTION

CROSS-REFERENCE TO RELATED APPLICATIONS

The present application is a non-provisional of 61/593,299 filed Jan. 31, 2012 and incorporates it by reference, for all purposes.

BACKGROUND

The present invention relates to mobile devices. More specifically, embodiments of the present invention relate to detection of user events with mobile devices and performing functions in response to the detected user events.

The recognition of a user's state in mobile devices has previously been previously accomplished through the use of discrete motion detectors. The motions sensed by these detectors are typically compared against characteristic thresholds with regard to direction, sign, and magnitude of the sensed force or rotation for each detector.

The inventors of the present invention have determined that problems with these type of detection methods include that sensor events that are detected are often handled as disparate events. Because of this, it is difficult to determine occurrence of complex events.

In light of the above, it is desired to have portable navigation systems with increased detection of more complex events without the drawbacks described above.

BRIEF SUMMARY OF THE INVENTION

The present invention relates to mobile devices. More specifically, embodiments of the present invention relate to matching of sensed physical perturbations to one or more event signatures, and to the performance of one or more actions associated with the matched event signatures. In various embodiments, the physical perturbations are sensed by one or more sensors within the mobile devices.

In various embodiments of the present invention, the mobile device is subjected to one or more physical perturbations. Such perturbations may include movement from one location to another location, as determined by wireless signals including GPS signals, WiFi signals, near-field communications, or the like. Other perturbations may include accelerations and alignment with respect to gravity, as determined by accelerometers; rotations in space, as determined by gyroscopes; changes in altitude, as determined by a pressure sensor; changes in location or orientation with respect to a magnetic field (e.g. Earth's magnetic field), as determined by a magnetometer; or the like.

These actions or motions may be detected by one or more electronic sensors within a portable or hand-held device. In various embodiments, typical electronic sensors ("sensors") used may include MEMS sensors: accelerometers, gyroscopes, magnetometers, pressure sensors, temperature sensors; and any other type of sensors: location sensors (e.g. GPS), radio-frequency detectors, optical sensors, infrared sensors, or the like. In operation the user's actions or motions are initially sensed and processed by the electronic sensors. A time series of values are typically provided as output by the sensors.

Typically, the physical perturbations applied to the mobile device are associated with movements of the user, whether walking, running, driving with the mobile device; user gesturing of the device, such as waving the device, in one or more predetermined patterns; or the like.

In various embodiments a determination of the actions to perform may include consideration of the user's body motion, the user's current activities (e.g. driving, shopping), the user's gestures, the execution of certain applications, a state history of the device, a future or intended user action; or the like. In additional embodiments, many other types of information that describes what a mobile user has done, is doing, or is expected to do may be also be detected, and may be used to determine one or more actions.

In various embodiments, the time series of sensor data are then compared to one or more "motion event signatures." These signatures are considered to be any repeatable pattern in a stream of data from one or more sensors that signify a defined event. In various embodiments, typical motion event signatures are defined through learning/calibration tests and analyses from data from a population of users, or from a specific user. For example, a specific user may be instructed to perform a specific event a number of times, and based upon the sensed data, the motion event signature for that user may be created.

In embodiments of the present invention, "vectorization" principles are used to compare or detect a match between the time series of sensor data to a motion event signature. With "vectorization" principles, weak signals (e.g. time series of sensor data) can be pulled up from noise to detect motion event signatures matches. Further, embodiments provide matched filtering principles to help detect one type of signal among others. In various embodiments, "motion event signatures" of certain types of motions or events can then be detected with high reliability while rejecting other types of events that are not being sought.

In various embodiments, vectorization principles can also be applied to the detection (or not) of multiple motion event signatures to detect or identify "context profiles." As described herein, context profiles are higher-level descriptions of user actions that are characterized by multiple sensor patterns or transitions or events. An example of different context profiles may include identification of simultaneous events to determine a context. For example, one context may be a user walking up the stairs. This context may require the identification of two simultaneous events such as: one event where the user is walking, and another event where there is a steady decrease in barometric pressure (e.g. decrease pressure event). In other embodiments, the context may alternatively rely upon GPS data, inertial data, positive vertical velocity data, map data (to signify the proximity of a staircase that coincides with the direction of user travel), or the like. In various embodiments, event profiles may also be predefined based upon learning/testing from a population of users, the specific user, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
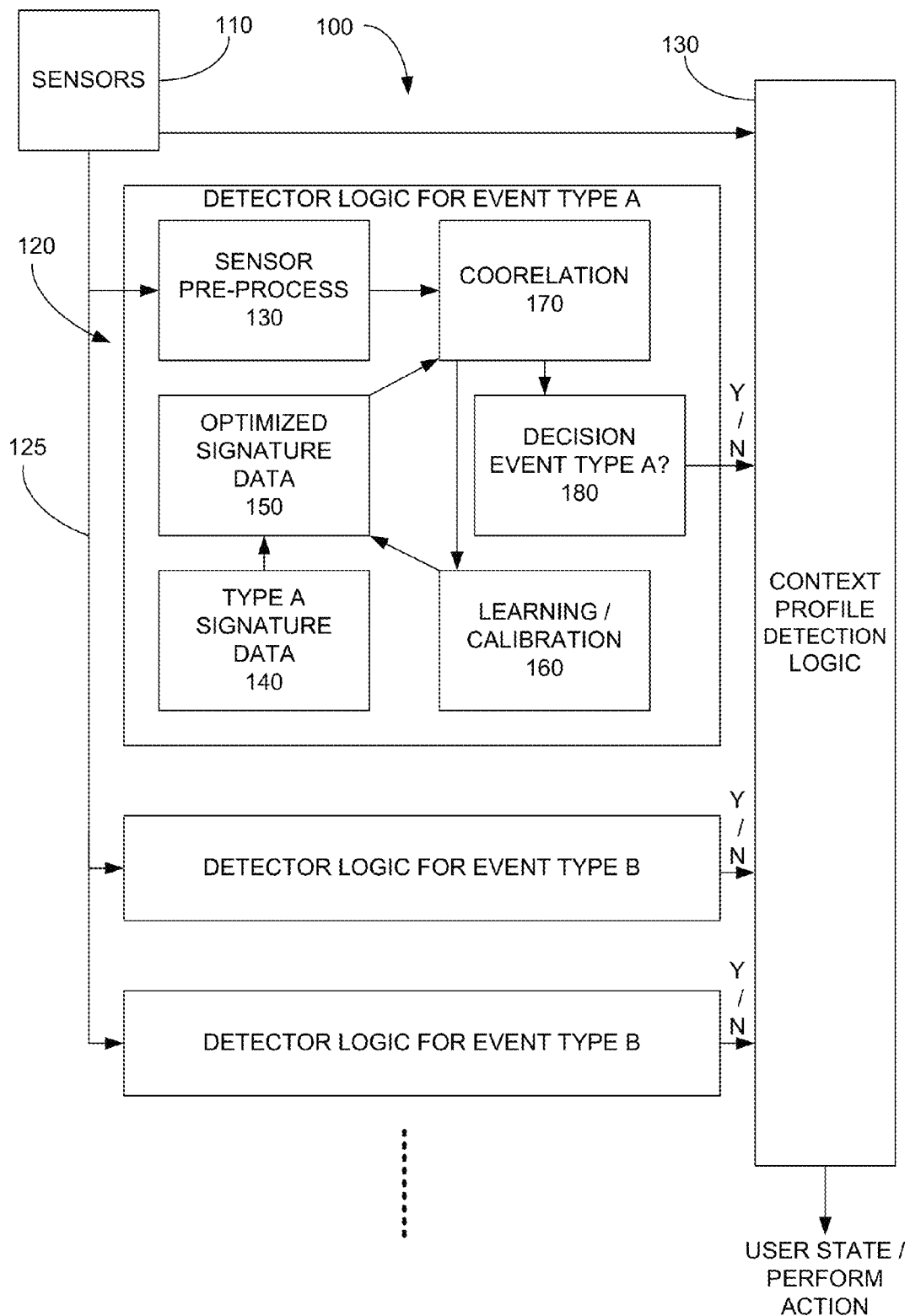
FIG. 1 illustrates an embodiment of the present invention.

FIG. 1 illustrates a block diagram of a system according to various embodiments of the present invention. More particularly, FIG. 1 illustrates a system 100 including sensors 110, one or more event detectors 120, and a context detection block 130.

In various embodiments, system 100 may be a portable device such as a phone (e.g. iPhone, GalaxyS3), a tablet computer (e.g. iPad, Kindle), or the like. In other embodiments, the portable device may include any mobile computing device, e.g. a GPS device, a fleet management system, a radio, a watch, or the like.

In various embodiments, systems 100 may include one or more sensors 110 that can sense a change of the portable device relative to the physical surroundings. As examples, sensors 110 may include accelerometers, gyroscopes, magnetometers, pressure sensors, GPS sensors, WiFi sensors, near field communications devices, and the like. In some embodiments, sensors 110 may be embodied as micro electrical mechanical (MEMS) devices, available from companies such as ST Micro, Bosch, M-Cube, or the like.

The sensors 110 typically sense the changes in physical surroundings in parallel, or at substantially the same time. As examples, an accelerometer and a magnetometer can both sense changes in heading of a system 100; an gyroscope can detect a roll condition and a pressure sensor can detect a decrease in pressure at the same time; or the like. In various embodiments, these signals on lines 125 are passed to one or more event detectors 120.

In some embodiments, event detectors 120 are logical data and processing structures within a program memory of a processor, or the like. The processor may receive the signals on lines 125 and execute the programs in program memory to determine one or more events. In other embodiments, event detectors 120 may include discreet logic, and in still other embodiments, event detectors 120 may include a combination of discreet logic and operations performed by one or more processors.

In various embodiments, event detectors 120 may include a sensor pre-processing block 130, an event signature block 140, an optimized event signature block 150, a learning calibration block 160, a correlation block 170, and a comparison block 180.

In some embodiments of the present invention, sensor pre-processing block 130 processes the sensed perturbations from sensors 110 on signal lines 125. For example, pre-processing block 130 may include changing or transforming coordinates, interpolating data, calculating rates, detecting changes in parameters, or the like. This data is then passed to correlation block 170.

In various embodiments, one or more event signatures 140 are stored in a memory. These event signatures 140 include one or more characteristic physical perturbations from sensors 110 that are associated with a specific event. As an example, one event signature may include determining if the user is walking, another event signature may include determining if the user is driving, or the like.

As illustrated in FIG. 1, event signature data 140 may be combined or modified with either calibration data or feedback data 160 from previous event detections. The combined or modified data 160 is then used to determine an optimized event signature 150 for a specific event and/or for a specific user. In various embodiments, for example, a shorter user may have a smaller stride length that may be measured and be incorporated into calibration or feedback data 160. As a result, optimized event signature data 150 may be calibrated for the smaller stride length of the user. In some embodiments the learning and calibration processing can either be done as an explicit foreground computation that is triggered by the user, performed as a mandatory step at start-up, run as a background computation to continually evolve the reference data sequence and optimize accuracy for a user, and the like.

Optimized signature data 150 is then input along with the data from pre-processing block 130 into correlation block 170. In various embodiments, correlation block 170 performs a vector matching process, and decision block 180 outputs a determination whether the event is detected or not. In various embodiments, the event output determination for different event detectors 120 may be asynchronous.

In other embodiments, other functional operations can be included into an event detector 120. For example, the learning and calibration processing may require position data or other sensor inputs in order to optimize the reference data signature, also termed the "proof" data.

In one specific example, a step detector event has been implemented. In various embodiments, a proof step (e.g. signature data 150) is first determined. As discussed above, based upon user calibration data 160, typical motions for a user step is determined as signature data 150. In various embodiments, to implement this process, as the user walks, sensors 110 measure physical perturbations. Next, a sensor preprocessing step 130 converts typical 3-axis acceleration data from the accelerometer into a single acceleration magnitude. In various embodiments, this process normalizes data with respect to gravity, user acceleration, and sensor biases. Once transformed in this way, these data are provided as learning/calibration data.

After calibration, in various embodiments, as the user walks, sensors 110 again capture movement data, and the movement data is processed in block 130. The processed data is then compared to the optimized signature data 150 within a correlation step 170. Additionally, if the correlation is above a certain threshold, decision block 180 signals occurrence of the event.

Figure 2:
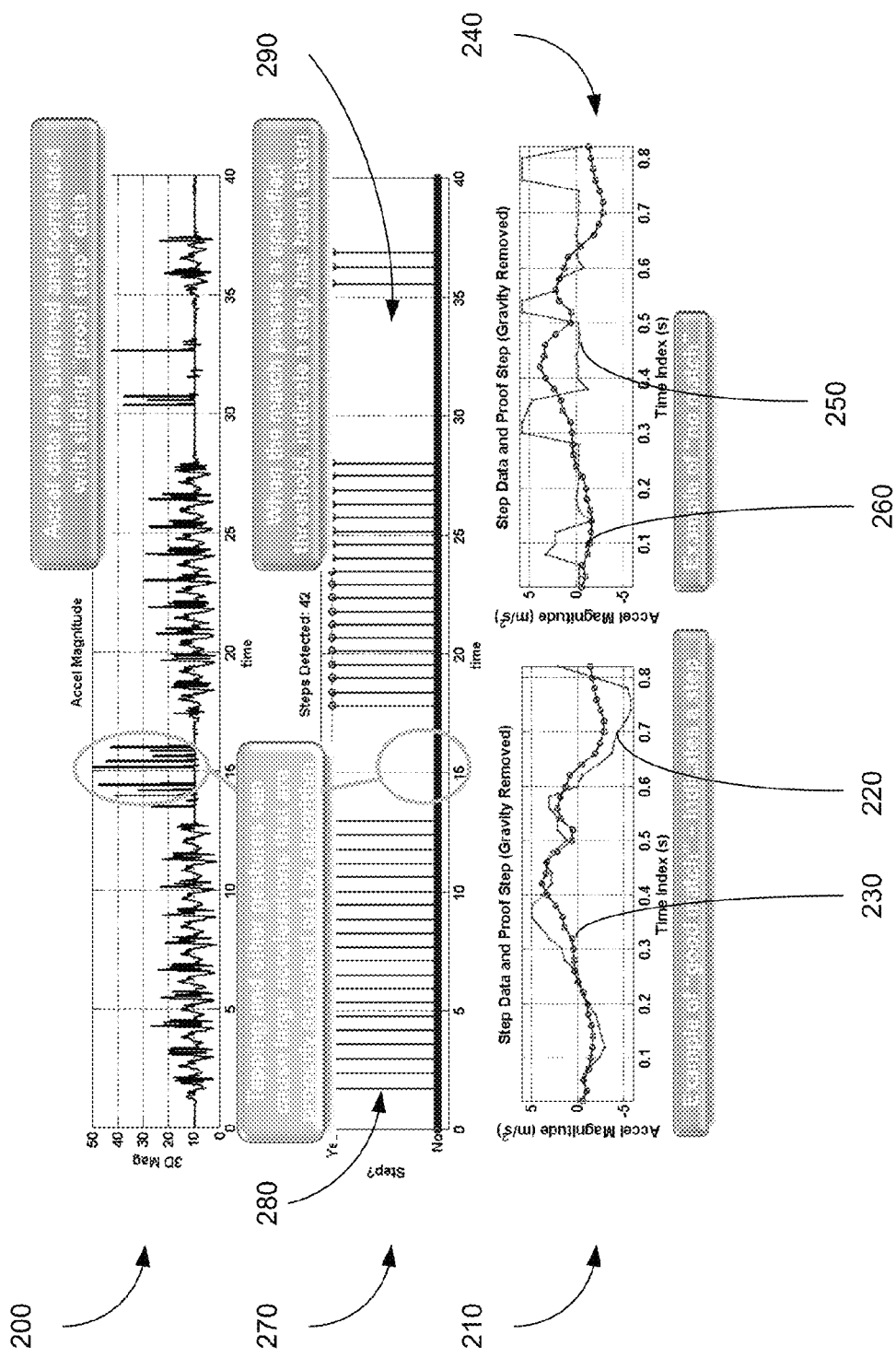
FIG. 2 illustrate an example according to embodiments of the present invention.

FIG. 2 illustrates an example of one embodiment of the present invention. More specifically, FIG. 2 illustrates a graph 200 of acceleration data sensed by acceleration sensors of a portable device, with respect to time. In particular, graph 200 represents magnitudes of acceleration of the portable device as a user moves.

Also illustrated in FIG. 2 is a graph 210 illustrating a more detailed view of an example of acceleration data with respect to time. In particular, in graph 210, line 220 illustrates an example of sensed acceleration data (normalized for gravity) of the person moving, and line 230 illustrates an example of an optimized walk event signature of the person walking. As can be seen, as many of the points on line 220 and 230 approximately correlate in this example, the device determines that the user motion is a step.

In various embodiments, in response to the detection of a step, a distance of a pedometer may be incremented, and output may display the number of user steps or the distance. In other embodiments, other functions may be performed. In one example, the determination of a step may be passed to an indoor navigation program to update a location of a user. In another example, the determination of a step may be passed to an exercise game, to reward the user with feedback, e.g. a ribbon for meeting an exercise goal, or the like.

Also illustrated in FIG. 2 is a graph 240 illustrating a more detailed view of acceleration data with respect to time. In particular, in graph 240, line 250 illustrates an example of sensed acceleration data (normalized for gravity) of the person moving, and line 260 illustrates an example of an optimized walk event signature of the person walking. As can be seen, as many of the points on line 250 and 260 do not approximately correlate in this example, the device determines that the user motion is not a step.

Graph 270 is illustrated using the same time scale as graph 200 in FIG. 2. As can be seen, when the sensed acceleration data and the event signature match to a high degree (e.g. graph 210), an event (e.g. step 280) is detected. Further, as illustrated, at other times, determinations can be made that the event does not occur 290. In response to the step determinations, as discussed above, various functions can then be performed.

In other embodiments, the same approach above, may be applied to many other events, such as the user tapping on the device, shaking the device, turning the device, running with the device, waving the device, making application-specific gestures with the device, and the like. In light of the present patent disclosure, one of ordinary skill in the art will recognize that many other applications may be performed upon determination of application-specific gestures, and the like.

In various embodiments, raw sensor data from sensors 110 are not always available at a rate that is useful or needed by the matching process. For example, to save power, an accelerometer may sample at a lower sampling rate. Accordingly, to facilitate the availability of sensor data, techniques such as interpolation, extrapolation, sample-and-hold, splining, or other means can be used. In various embodiments, the sensed data may appear available at a uniform pre-determined sample rate, In various embodiments, context profiles may be determined based upon the occurrence (or not) of more than one event. For example, for portable device, if a step event is detected as well as a gradual decrease in atmospheric pressure event, these events may be matched to a walking upstairs context profile.

In one example, it is detected that the user lifts the device from a pocket, purse and views the display. At substantially the same time it is detected that the user is located at a specific geographic location (e.g. landmark, store, ski run). In some examples, these two events may match a predefined context. Such contexts may specify that the user should be presented with information related to the specific geographic location (e.g. historical information text, audio clips; store directory, coupons; ski run information; or the like).

As another example, it is detected that the user is pointing the device, e.g. phone, towards a product, and substantially the same time the user taps on the display or a button. In some examples, these two events may match a predefined context. Such contexts may specify that the user should be presented with information related to the product (e.g. specifications, incentives, purchase options, or the like).

As another example, it is detected that the user is turning a corner while walking. In some examples, these two events may match a predefined context. Such contexts may specify that the user path segment should be recorded, and/or that a map displayed should rotate, or the like.

As still another example, it is detected that the user has been walking; shortly thereafter there is a large translational movement without the user stepping; and the user is near a bus stop, train platform, or the like. In some examples, these three events may match a predefined context, such as the user boarding a vehicle. Such contexts may specify that the user should be presented with information (e.g. bus routes, traffic delays, train routes, or the like.

In various embodiments, based upon the identified context profile, any number of functions can be performed. As examples, a map displayed to the user may be updated, particular advertisements may be displayed to the user, automatic tweets or social network posts may be sent, and the like.

In still other embodiments, events and context profiles need not be binary, but may also employ a fuzzy logic approach to determining user state. In such embodiments, by observing actual correlation values for each event/gesture, either as a raw value or as a percentage of the threshold, a likelihood that a user is performing some action may be more accurately determined. In various embodiments, these estimates constitute both the measurement and confidence metrics that can make downstream processing (such as location/navigation) much more robust during real-world use.

The increased availability of low-cost MEMS sensors and more stringent user expectations of mobile technology with regard to motion detection and navigation has produced a demand for higher accuracy in the sensing of user motion, user event, user orientation, gestures, and events. Conventional algorithms, which are often very concerned with detecting only a very small number of user motion events or combinations, and only with modest success rates to enable the control of music applications, phone call support and basic gestures, are insufficient to aid high-performance applications, where even small or infrequent motion sensing errors can accumulate over time and cause very large user location/state errors.

Figure 3:
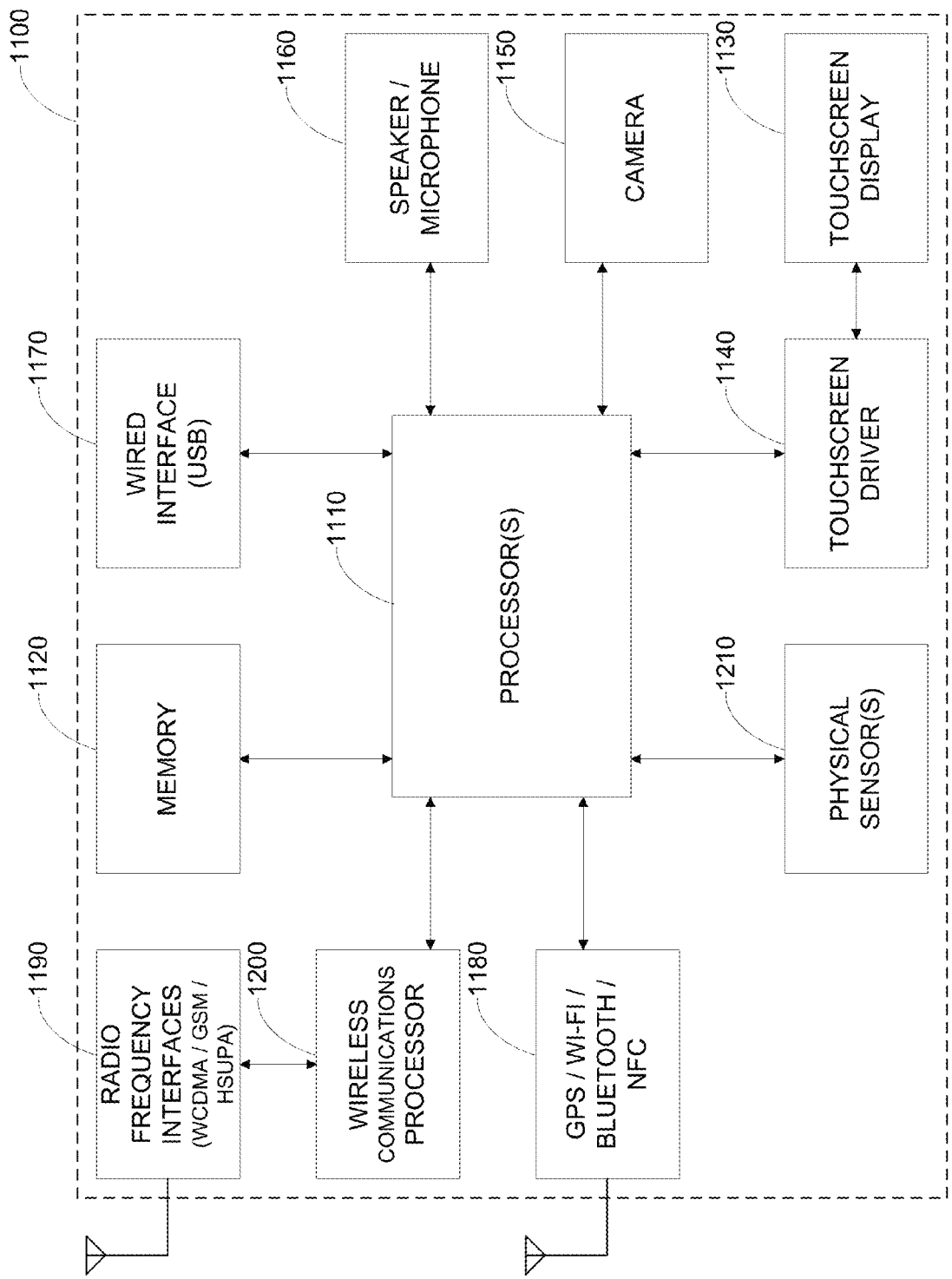
FIG. 3 illustrates a block diagram of a process for fabrication embodiments of the present invention.

FIG. 3 illustrates a functional block diagram of various embodiments of the present invention. In FIG. 3, a computing device 400 typically includes an applications processor 410, memory 420, a touch screen display 430 and driver 440, an image acquisition device 450, audio input/output devices 460, and the like. Additional communications from and to computing device are typically provided by via a wired interface 470, a GPS/Wi-Fi/Bluetooth interface 480, RF interfaces 490 and driver 500, and the like. Also included in various embodiments are physical sensors 510.

In various embodiments, computing device 400 may be a hand-held computing device (e.g. Apple iPad, Apple iTouch, Lenovo Skylight/IdeaPad, Asus EEE series, Microsoft 8 tablet, Samsung Galaxy Tab, Android Tablet), a portable telephone (e.g. Apple iPhone, Motorola Droid series, Google Nexus S, HTC Sensation, Samsung Galaxy S series, Nokia Lumina series), a portable computer (e.g. netbook, laptop, ultrabook), a media player (e.g. Microsoft Zune, Apple iPod), a reading device (e.g. Amazon Kindle Fire, Barnes and Noble Nook), or the like.

Typically, computing device 400 may include one or more processors 410. Such processors 410 may also be termed application processors, and may include a processor core, a video/graphics core, and other cores. Processors 410 may be a processor from Apple (A4/A5), Intel (Atom), NVidia (Tegra 3, 4, 5), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 420 may include different types of memory (including memory controllers), such as flash memory (e.g. NOR, NAND), pseudo SRAM, DDR SDRAM, or the like. Memory 420 may be fixed within computing device 400 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 430 and driver 440 may be based upon a variety of later-developed or current touch screen technology including resistive displays, capacitive displays, optical sensor displays, electromagnetic resonance, or the like. Additionally, touch screen display 430 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 450 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 460 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 410 to enable the user to operate computing device 400 by stating voice commands. Additionally, a speech engine may be provided in various embodiments to enable computing device 400 to provide audio status messages, audio response messages, or the like.

In various embodiments, wired interface 470 may be used to provide data transfers between computing device 400 and an external source, such as a computer, a remote server, a storage network, another computing device 400, or the like. Such data may include application data, operating system data, firmware, or the like. Embodiments may include any later-developed or conventional physical interface/protocol, such as: USB 4.0, 5.0, micro USB, mini USB, Firewire, Apple iPod connector, Ethernet, POTS, or the like. Additionally, software that enables communications over such networks is typically provided.

In various embodiments, a wireless interface 480 may also be provided to provide wireless data transfers between computing device 400 and external sources, such as computers, storage networks, headphones, microphones, cameras, or the like. As illustrated in FIG. 3, wireless protocols may include Wi-Fi (e.g. IEEE 802.11a/b/g/n, WiMax), Bluetooth, IR, near field communication (NFC), ZigBee and the like.

GPS receiving capability may also be included in various embodiments of the present invention, however is not required. As illustrated in FIG. 3, GPS functionality is included as part of wireless interface 480 merely for sake of convenience, although in implementation, such functionality is currently performed by circuitry that is distinct from the Wi-Fi circuitry and distinct from the Bluetooth circuitry.

Additional wireless communications may be provided via RF interfaces 490 and drivers 500 in various embodiments. In various embodiments, RF interfaces 490 may support any future-developed or conventional radio frequency communications protocol, such as CDMA-based protocols (e.g. WCDMA), GSM-based protocols, HSUPA-based protocols, or the like. In the embodiments illustrated, driver 500 is illustrated as being distinct from applications processor 410. However, in some embodiments, these functionality are provided upon a single IC package, for example the Marvel PXA330 processor, and the like. It is contemplated that some embodiments of computing device 400 need not include the RF functionality provided by RF interface 490 and driver 500.

FIG. 3 also illustrates computing device 400 to include physical sensors 510. In various embodiments of the present invention, physical sensors 510 are multi-axis Micro-Electro-Mechanical Systems (MEMS) based devices being developed by M-cube, the assignee of the present patent application. Physical sensors 510 developed by M-cube, the assignee of the present patent application, currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 400 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 510 are manufactured using a foundry-compatible process. As explained in such applications, because the process for manufacturing such physical sensors can be performed on a standard CMOS fabrication facility, it is expected that there will be a broader adoption of such components into computing device 400. In other embodiments of the present invention, conventional physical sensors 510 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7, 8), Google Android (e.g. 5.x, 4.x), Symbian, or the like. In various embodiments of the present invention, the operating system may be a multi-threaded multi-tasking operating system. Accordingly, inputs and/or outputs from and to touch screen display 430 and driver 440 and inputs/or outputs to physical sensors 510 may be processed in parallel processing threads. In other embodiments, such events or outputs may be processed serially, or the like. Inputs and outputs from other functional blocks may also be processed in parallel or serially, in other embodiments of the present invention, such as image acquisition device 450 and physical sensors 510.

FIG. 3 is representative of one computing device 400 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 3. For example, in various embodiments, computing device 400 may lack image acquisition unit 450, or RF interface 490 and/or driver 500, or GPS capability, or the like. Additional functions may also be added to various embodiments of computing device 400, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. As an example, in response to an identified context, e.g. gesture, particular promotional material, e.g. advertisements, may be displayed to a user. Such embodiments may be termed, gestures to enable or disable advertisements on a mobile device/context based services.

In various embodiments, user movements, or the like, may be used to enable or disable applications or operations on a mobile device. In some embodiments, these operations are termed context-based services and may be performed automatically or upon user request.

In various embodiments, the user movements may be associated with movement of the device while the device is stored in the user's pocket, purse, or the like. In other embodiments, the user movements may be associated with specific gestures or movement of the device, while, for example, in the user's hands, mounted on the user's head, or the device.

In various embodiments, a variety of operations may be performed upon matching the user gestures with predefined gestures. For example, some operations may include opening of applications, dialing or calling of phone numbers, sending of tweets or messages, displaying advertisements, making social network updates, checking in, or the like In one example of this context based service, a matching algorithm determines that a user has been walking for 20 minutes, and determines that the ambient temperature is 90 F. Next, based upon this context match, embodiments of the present invention may prompt user to take a break from walking. Another embodiment of the present invention may also determine a location of the closest convenience store and recommend the get a drink. In various embodiments, a drink manufacturer, the convenience store, a Chamber of Commerce, or the like may sponsor such a message. In various embodiments, multiple competing convenience stores, restaurants, coffee stores, pubs, or the like may bid for the right to be an exclusive advertiser within a geographic region; and in other embodiments, multiple service providers may advertise simultaneously.

In another example of this context based service, a matching algorithm determines that a user has been driving for an extended period of time on a highway (e.g. by monitoring by GPS user locations with respect to time, and/or correlating against a geographic map to identify an interstate). Next, in response to the context match, embodiments may suggest the user to take a specific exit for food, a break, gas, lodging, or the like. In various embodiments, the suggestions may be prompted by an upcoming exit or rest stop, or the like. For example, a matching algorithm may be: if the user has been driving for over 4 hours AND there is an upcoming rest stop, display the rest stop information to the user. Similar to the example above, the offering of services may be a service that is company sponsored (e.g. McDonalds, Cheveron, or the like) and/or include a promotion, or may be a public service that includes multiple service opportunities.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for determining an action for a user, implemented in a computing system programmed to perform the method comprising:

receiving in the computing system, a first time series of physical perturbations with a first physical sensor in response to physical perturbations of the computing system;

receiving in the computing system, a second time series of physical perturbations with a second physical sensor in response to the physical perturbations of the computing system;

pre-processing the first time series of physical perturbations from the first physical sensor and the second time series of physical perturbations from the second physical sensor to determine a first event calibration data;

determining in the computing system, an event vector in response to the first time series of physical perturbations and in response to the second time series of physical perturbations;

receiving in the computing system, a third time series of physical perturbations with a third physical sensor in response to the physical perturbations of the computing system;

determining in the computing system, another event vector in response to the third time series of physical perturbations;

comparing in the computing system, the event vector to an optimized first event signature to determine a first value, the optimized first event signature being determined from a first event signature stored in a memory and the first event calibration data;

determining in the computing system, occurrence of a first event when the first value exceeds a first threshold;

comparing in the computing system, the event vector to an optimized second event signature to determine a second value, the optimized second event signature being determined from a second event signature stored in the memory and a second event calibration data determined from pre-processing the first time series of physical perturbations from the first physical sensor and the second time series of physical perturbations from the second physical sensor;

comparing in the computing system, the another event vector to the optimized second event signature to determine the second value;

determining in the computing system, occurrence of a second event when the second value exceeds a second threshold;

and
determining in the computing system, a first action for the computing system in response to the determining in the computing system, occurrence of the first event, wherein the determining the first action comprises a vector matching process, wherein determining in the computing system, the first action for the computing system is also in response to determining in the computing system, occurrence of the second event, wherein the first event signature comprises a user-step signature; and wherein the second event signature comprises an altitude difference signature.

2. The method of claim 1 wherein the first action comprises determining a location of the user within a map.

3. The method of claim 2 further comprising displaying in the computer system a representation of the location of the user on a portion of the map onto a display.

4. The method of claim 1 further comprising
comparing in the computing system, the event vector to the optimized second event signature to determine the second value, the optimized second event signature being determined from the second event signature stored in the memory and the second event calibration data determined from pre-processing the first time series of physical perturbations from the first physical sensor and the second time series of physical perturbations from the second physical sensor;

determining in the computing system, non-occurrence of the second event when the second value fails to exceed a second threshold; and wherein determining in the computing system, the first action for the computing system is also in response to the determining in the computing system, the non-occurrence of the second event.

5. The method of claim 1
wherein the first physical sensor comprises an accelerometer; and
wherein the second physical sensor comprises a gyroscope.

6. The method of claim 1
wherein the first physical sensor is selected from a group consisting of: an accelerometer, a gyroscope, a magnetometer, a pressure sensor, a wireless receiver;
wherein the second physical sensor is selected from a group consisting of: an accelerometer, a gyroscope, a magnetometer, a pressure sensor, a wireless receiver; and
wherein the first physical sensor is different from the second physical sensor.

7. A computing system specifically programmed by executable software code to determine an action for a user, the computing system comprising:
a first physical sensor configured to determine a first time series of physical perturbations in response to physical perturbations applied to the computing system;
a second physical sensor configured to determine a second time series of physical perturbations in response to the physical perturbations applied to the computing system;
a third physical sensor configured to determine a third time series of physical perturbations in response to the physical perturbations applied to the computing system;
a memory configured to store a first event signature and first executable software code associated with a first action and associated with the first event signature; and a processor coupled to the first physical sensor, to the second physical sensor, to the third physical sensor, and to the memory, wherein the processor is programmed to:
pre-process the first time series of physical perturbations from the first physical sensor and the second time series of physical perturbations from the second physical sensor to determine a first event calibration data,
determine an event vector in response to the first time series of physical perturbations and in response to the second time series of physical perturbations,
receive the third time series of physical perturbations with the third physical sensor in response the physical perturbations of the computing system;
determine another event vector in response to the third time series of physical perturbations;
compare the event vector to an optimized first event signature to determine a first value, the optimized first event signature being determined from the first event signature and the first event calibration data,
execute the first executable software code when the first value exceeds a first threshold,
compare the event vector to an optimized second event signature to determine a second value, the optimized second event signature being determined from a second event signature stored in the memory and a second event calibration data determined from pre-processing the first time series of physical perturbations from the first physical sensor and the second time series of physical perturbations from the second physical sensor;
determine occurrence of a second event when the second value exceeds a second threshold;
compare the another event vector to the second event signature to determine the second value;
wherein the processor is programmed to determine occurrence of the second event when the second value exceeds the second threshold; and
wherein the processor is programmed to determine the first action for the computing system in also response to a determination of the occurrence of the second event;
wherein determining when the first value exceeds a first threshold comprises a vector matching process,
wherein the first event signature comprises a user-step signature; and
wherein the second event signature comprise an altitude difference signature.

8. The computer system of claim 7 wherein the first action comprises the processor programmed to determine a location of the user within a map.

9. The computer system of claim 8 further comprising a display configured to display a representation of the location of the user on a portion of the map.

10. The computer system of claim 7,
wherein the processor is programmed to compare the event vector to the optimized second event signature to determine the second value, the optimized second event signature being determined from the second event signature stored in the memory and the second event calibration data determined from pre-processing the first time series of physical perturbations from the first physical sensor and the second time series of physical perturbations from the second physical sensor;
wherein the processor is programmed to determine non-occurrence of the second event when the second value fails to exceed the second threshold; and wherein the processor is programmed to determine the first action for the computing system also in response to a determination of the non-occurrence of the second event.

11. The computer system of claim 7
wherein the first physical sensor comprises an accelerometer; and
wherein the second physical sensor comprises a gyroscope.

12. The computer system of claim 7
wherein the first physical sensor is selected from a group consisting of: an accelerometer, a gyroscope, a magnetometer, a pressure sensor, a wireless receiver;
wherein the second physical sensor is selected from a group consisting of: an accelerometer, a gyroscope, a magnetometer, a pressure sensor, a wireless receiver, and
wherein the first physical sensor is different from the second physical sensor.

13. A computer-implemented method for determining an action for a user, implemented in a computing system programmed to perform the method comprising:
receiving in the computing system, a first time series of physical perturbations with a first physical sensor in response to physical perturbations of the computing system;
receiving in the computing system, a second time series of physical perturbations with a second physical sensor in response to the physical perturbations of the computing system;
pre-processing the first time series of physical perturbations from the first physical sensor and the second time series of physical perturbations from the second physical sensor to determine a first event calibration data;
determining in the computing system, an event vector in response to the first time series of physical perturbations and in response to the second time series of physical perturbations;
receiving in the computing system, a third time series of physical perturbations with a third physical sensor in response to the physical perturbations of the computing system;
determining in the computing system, another event vector in response to the third time series of physical perturbations;
comparing in the computing system, the event vector to an optimized first event signature to determine a first value, the optimized first event signature being determined from a first event signature stored in a memory and the first event calibration data;
determining in the computing system, occurrence of a first event when the first value exceeds a first threshold;
comparing in the computing system, the event vector to an optimized second event signature to determine a second value, the optimized second event signature being determined from a second event signature stored in the memory and a second event calibration data determined from pre-processing the first time series of physical perturbations from the first physical sensor and the second time series of physical perturbations from the second physical sensor;
comparing in the computing system, the another event vector to the optimized second event signature to determine the second value;
determining in the computing system, occurrence of a second event when the second value exceeds a second threshold;
and
determining in the computing system, a first action for the computing system in response to the determining in the computing system, occurrence of the first event, wherein the determining the first action comprises a vector matching process,
wherein determining in the computing system, the first action for the computing system is also in response to determining in the computing system, occurrence of the second event,
wherein the first event signature comprises a horizontal step signature; and
wherein the second event signature comprises a vertical step signature.

* * * * *